United States Patent
Pearson et al.

(10) Patent No.: US 11,794,873 B2
(45) Date of Patent: Oct. 24, 2023

(54) AUXILIARY POWER UNIT ENCLOSURE AND METHOD OF MAKING THE SAME

(71) Applicant: The Boeing Company, Chicago, IL (US)

(72) Inventors: Steven E. Pearson, Lynnwood, WA (US); Rosario Vingiani, Seattle, WA (US); Rajagopalan Margessery, Seattle, WA (US); Bernhard Dopker, Bellevue, WA (US); Richard R. Rosman, Seattle, WA (US)

(73) Assignee: The Boeing Company, Arlington, VA (US)

( * ) Notice: Subject to any disclaimer, the term of this patent is extended or adjusted under 35 U.S.C. 154(b) by 864 days.

(21) Appl. No.: 16/296,594

(22) Filed: Mar. 8, 2019

(65) Prior Publication Data
US 2020/0283117 A1    Sep. 10, 2020

(51) Int. Cl.
*B64C 1/06* (2006.01)
*B64C 1/00* (2006.01)

(52) U.S. Cl.
CPC ............. *B64C 1/061* (2013.01); *B64C 1/068* (2013.01); *B64C 2001/0072* (2013.01); *B64C 2001/0081* (2013.01)

(58) Field of Classification Search
CPC . B64C 1/061; B64C 1/068; B64C 2001/0072; B64C 2001/0081; B64C 1/00; B64D 2041/002; B64D 29/04; B64D 41/00
See application file for complete search history.

(56) References Cited

U.S. PATENT DOCUMENTS

| | | | |
|---|---|---|---|
| 6,581,874 B2 * | 6/2003 | Lemire | B64D 41/00 244/54 |
| 7,891,608 B2 | 2/2011 | Rawdon et al. | |
| 8,128,025 B2 | 3/2012 | Rawdon et al. | |
| 8,657,233 B2 * | 2/2014 | Meseguer Mata | B64D 41/00 244/119 |
| 9,765,512 B2 | 9/2017 | Williams | |
| 10,940,956 B2 * | 3/2021 | Barsali | B64D 41/00 |
| 2008/0099611 A1 * | 5/2008 | Martino Gonzalez | B64D 29/08 244/119 |
| 2010/0327113 A1 | 12/2010 | Marquez Lopez et al. | |

(Continued)

FOREIGN PATENT DOCUMENTS

| | | |
|---|---|---|
| EP | 1 764 306 | 3/2007 |
| EP | 1 918 203 | 5/2008 |

(Continued)

OTHER PUBLICATIONS

F.C. Campbell, Introduction and Uses of Lightweight Materials, 2012, ASM International, Lightweight Materials—Understanding the Basics, All pages (Year: 2012).*

(Continued)

*Primary Examiner* — Valentina Xavier
(74) *Attorney, Agent, or Firm* — Walters & Wasylyna LLC

(57) ABSTRACT

An auxiliary power unit enclosure of an aircraft includes a space frame configured to carry a load and defining an auxiliary power unit compartment. The space frame includes a plurality of frame elements coupled together at a plurality of nodes. The auxiliary power unit enclosure also includes a fairing coupled to and surrounding the space frame.

20 Claims, 12 Drawing Sheets

(56) References Cited

U.S. PATENT DOCUMENTS

| | | | | |
|---|---|---|---|---|
| 2012/0132749 | A1* | 5/2012 | Meseguer Mata | B64D 41/00 |
| | | | | 244/119 |
| 2012/0141703 | A1* | 6/2012 | Goetze | B64C 1/068 |
| | | | | 428/34.1 |
| 2012/0318913 | A1* | 12/2012 | Filho | B64D 41/00 |
| | | | | 244/58 |
| 2013/0084422 | A1* | 4/2013 | Thable | B64C 1/069 |
| | | | | 428/137 |
| 2017/0154150 | A1 | 6/2017 | Schaefer | |
| 2017/0341729 | A1* | 11/2017 | Arevalo Rodr Guez | |
| | | | | B64C 7/00 |
| 2018/0170513 | A1* | 6/2018 | Martino Gonz Lez | |
| | | | | B64D 27/20 |
| 2019/0161211 | A1* | 5/2019 | Arana Hidalgo | B64D 27/26 |
| 2020/0385138 | A1* | 12/2020 | Dionne | B64D 27/02 |
| 2021/0114742 | A1* | 4/2021 | Casado-Montero | F01D 25/12 |

FOREIGN PATENT DOCUMENTS

| | | |
|---|---|---|
| EP | 2 535 274 | 12/2012 |
| EP | 3 040 264 | 7/2016 |
| FR | 2 928 137 | 9/2009 |
| GB | 2 448 997 | 11/2008 |

OTHER PUBLICATIONS

European Patent Office, Extended European Search Report, App. No. 20160874.2 (dated Aug. 3, 2020).
European Patent Office, "Communication pursuant to Article 94(3) EPC," App. No. 20 160 874.2 (dated Feb. 2, 2022).

* cited by examiner

AUXILIARY POWER UNIT ENCLOSURE AND METHOD OF MAKING THE SAME

FIELD

The present disclosure is generally related to airframe components of an aircraft and, more particularly, to an auxiliary power unit enclosure that is integrated into the airframe of the aircraft.

BACKGROUND

An airframe of an aircraft is a mechanical structure that typically forms a fuselage, empennage and wings of the aircraft. The fuselage of most modern aircraft is constructed using a monocoque or a semi-monocoque type of airframe assembly. An auxiliary power unit (APU) is a device on the aircraft that provides energy for functions other than propulsion. As an example, the APU typically includes a gas turbine engine that operates to provide various power inputs when main propulsion engines are not operating and/or supplemental power to that generated during main engine operation. The APU is typically located within an isolated section of the fuselage that is segregated from other areas, commonly referred to as an APU compartment. The portion of the airframe forming the APU compartment must be capable of withstanding heat generated during normal operation of the APU and extreme temperatures resulting from a fault in the APU, such as a thermal event within the APU compartment. Thus, it is desirable to form an enclosure around the APU to protect the airframe from thermal effects of a thermal event and maintain an enclosure for a thermal suppression system. Conventional practice involves coupling insulation blankets to an interior of the airframe using support brackets. However, use of insulation blankets and associated support brackets increase the weight, cost, and production time of the aircraft. Accordingly, those skilled in the art continue with research and development efforts in the field of APU enclosures and, as such, apparatuses and methods, intended to address the above-identified concerns, would find utility.

SUMMARY

The following is a non-exhaustive list of examples, which may or may not be claimed, of the subject matter according to the present disclosure.

In an example, a disclosed auxiliary power unit enclosure of an aircraft includes a space frame configured to carry a load and defining an auxiliary power unit compartment. The space frame includes a plurality of frame elements coupled together at a plurality of nodes. The auxiliary power unit enclosure also includes a fairing coupled to and surrounding the space frame.

In an example, a disclosed fuselage of an aircraft includes an airframe and a space frame coupled to the airframe. The space frame is configured to carry a load and defines an auxiliary power unit compartment for stowing an auxiliary power unit of the aircraft. The space frame includes a plurality of frame elements coupled together at a plurality of nodes 110. The fuselage also includes a fairing coupled to and surrounding the space frame.

In an example, a disclosed method of making an aircraft includes steps of: (1) coupling a plurality of annular frame elements and a plurality of longitudinal frame elements together at a plurality of nodes; (2) coupling a plurality of diagonal frame elements to at least one of the plurality of annular frame elements and the plurality of longitudinal frame elements proximate to the plurality of nodes to form a space frame; (3) coupling a fairing to the space frame; and (4) coupling the space frame to an airframe to form a fuselage of the aircraft.

Other examples of the disclosed fixtures, systems, and methods will become apparent from the following detailed description, the accompanying drawings and the appended claims.

DETAILED DESCRIPTION

Figure 1:
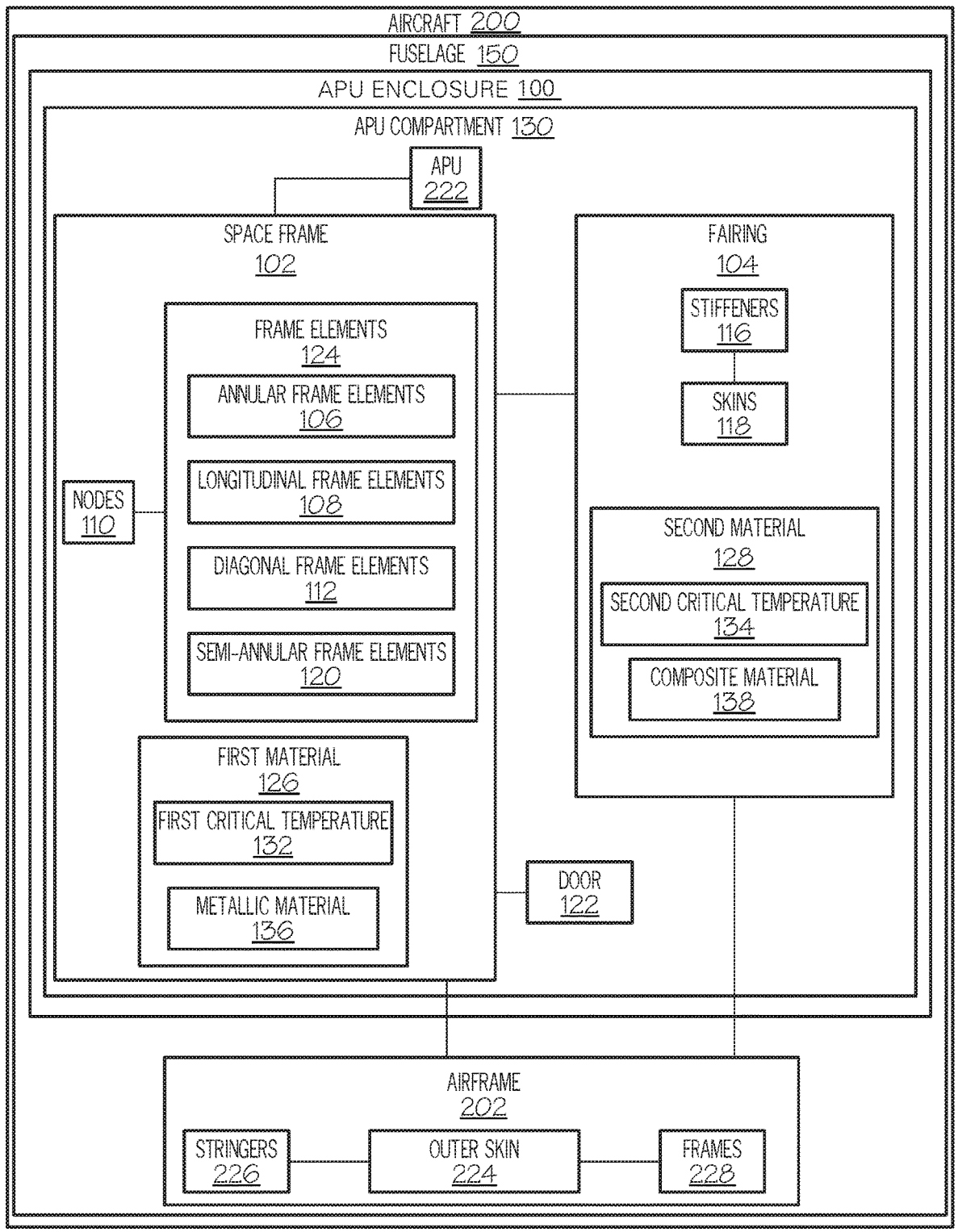
FIG. 1 is a schematic block diagram of an example of an aircraft.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring generally to FIG. 1 and particularly to FIGS. 2-10, examples of an auxiliary power unit (APU) enclosure 100 of an aircraft 200 are disclosed. In an example, the APU enclosure 100 includes a space frame 102. The space frame 102 is configured to carry and react to a load (i.e., provides a load path to distribute or transfer a load). The space frame 102 defines, or forms, an auxiliary power unit (APU) compartment 130. The APU compartment 130 is configured to stow an auxiliary power unit (APU) 222 of the aircraft 200. The space frame 102 includes a plurality of frame elements 124 coupled together at a plurality of nodes 110. The APU enclosure 100 includes a fairing 104. The fairing 104 is coupled to and surrounds the space frame 102.

Figure 2:
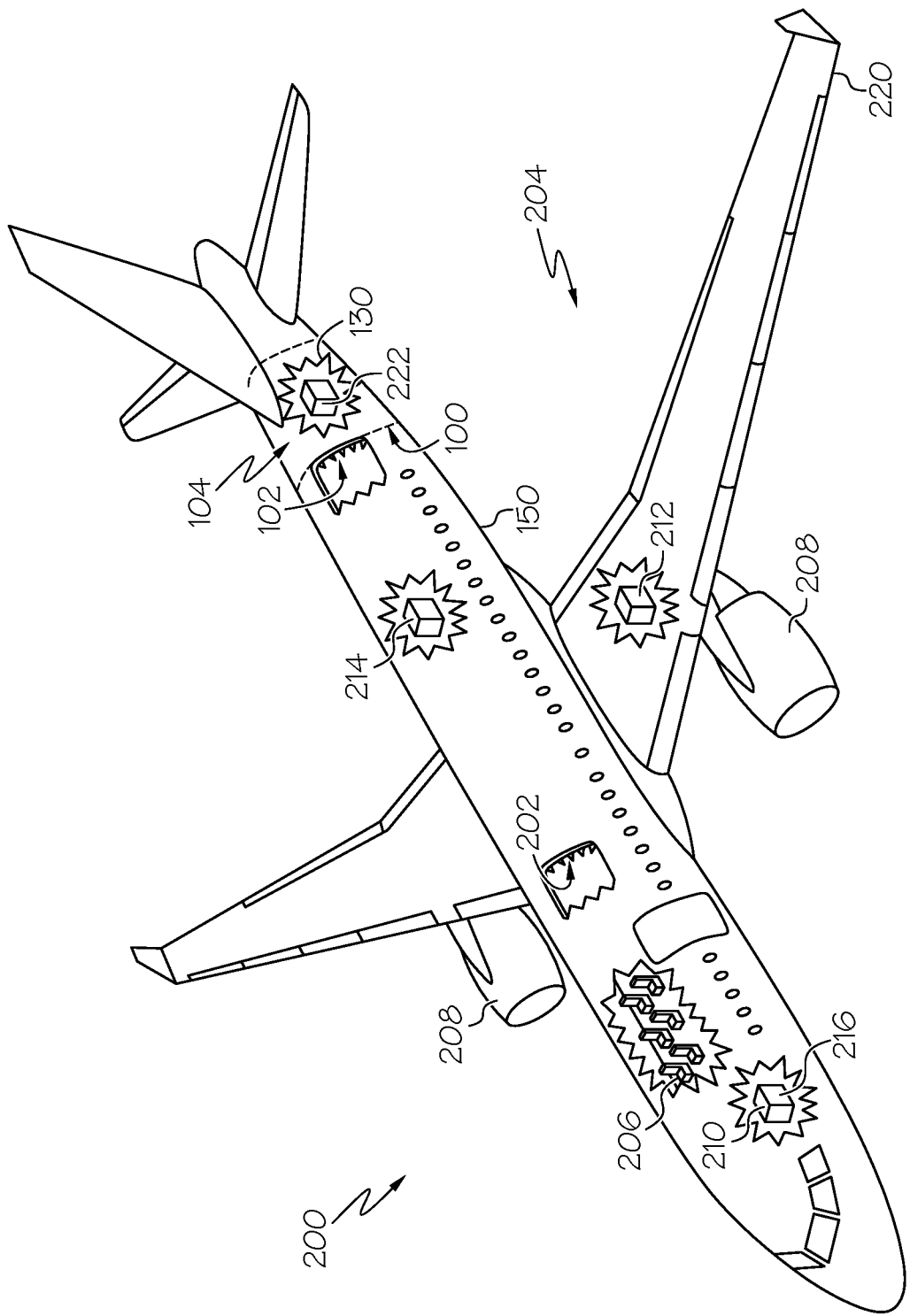
FIG. 2 is a schematic illustration of an example of the aircraft of FIG. 1.
Figure 3:
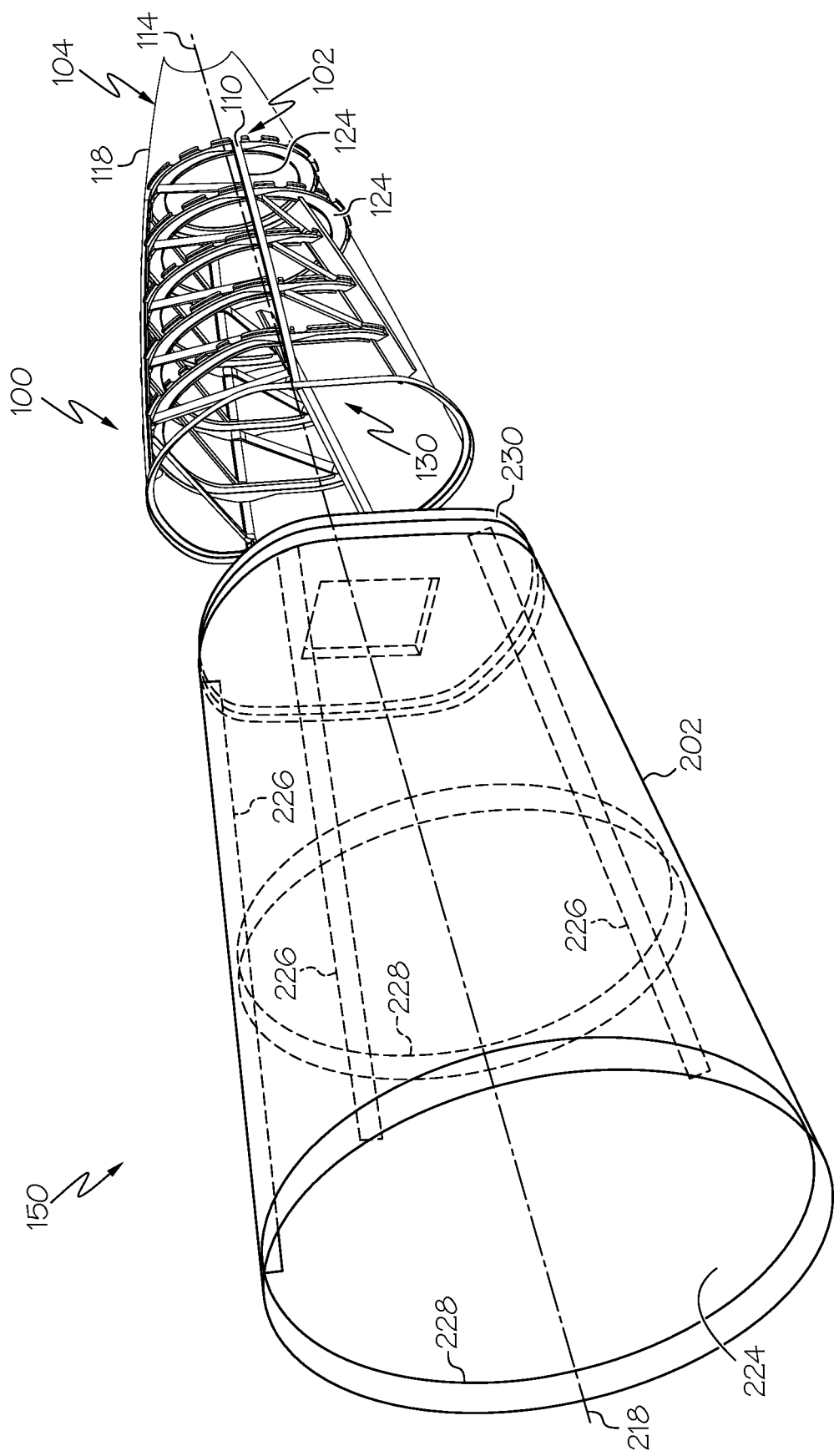
FIG. 3 is a schematic, perspective view of an example of a portion of a fuselage of the aircraft of FIG. 1.

Referring to FIGS. 1-3, examples of a fuselage 150 of the aircraft 200 are disclosed. Generally, the APU enclosure 100 is integrated into and/or forms a structural component of the fuselage 150. As used herein, a "structural component" refers to a load-bearing member or active structural element of an assembly that is configured to, or has the capacity to, carry and/or transfer a load. In an example, the fuselage 150 includes an airframe 202. The airframe 202 is configured to carry a load (i.e., is a structural component of the fuselage 150). The fuselage 150 also includes the space frame 102. The space frame 102 is coupled to the airframe 202. The space frame 102 is configured to carry a load (i.e., is a structural component of the fuselage 150). The space frame 102 defines, or forms, the APU compartment 130 for stowing the APU 222 of the aircraft 200. The space frame 102 includes the plurality of frame elements 124 coupled together at the plurality of nodes 110 (FIG. 1). The fuselage 150 also includes the fairing 104. The fairing 104 is coupled to and surrounds the space frame 102.

FIG. 2 illustrates an example of the aircraft 200. In the illustrative example, the aircraft 200 is a fixed-wing aircraft. The aircraft 200 includes the fuselage 150 and a pair of wings 220. Generally, the airframe 202 forms the central structure of the fuselage 150 and the wings 220. The aircraft 200 also includes a plurality of high-level systems 204, such as, but not limited to, a propulsion system 208, an electrical system 210, a hydraulic system 212, an environmental system 214, and/or a communications system 216. Any number of other systems may also be included. In an example, the APU 222 is a component of or provides power to one or more of the high-level systems 204.

The fuselage 150 forms a main body of the aircraft 200 and defines an interior 206 configured to hold a crew, one or more passengers, cargo, and the high-level systems 204. In the illustrative example, the fuselage 150 is an elongate, generally cylindrical central structure. The fuselage 150 includes a nose portion at a forward end and a tail portion at an aft end. In an example, the APU enclosure 100 is located proximate to or forms a part of the tail portion of the fuselage 150.

As illustrated in FIG. 2, in an example of the aircraft 200, the APU 222 is located within the APU enclosure 100 of the fuselage 150. In an example, the APU 222 includes an internal combustion engine (not illustrated), such as a gas turbine engine, that operates to provide mechanical input to various components, such as an electrical generator (not illustrated). The APU enclosure 100 provides a containment structure capable of maintaining its strength in response to heat generated during normal operation of the APU 222 and extreme heat resulting from a thermal event within the APU compartment 130, such as due to a fault in the APU 222 located within the APU enclosure 100.

FIG. 3 illustrates a portion of the fuselage 150. The APU enclosure 100 has a longitudinal axis 114. Generally, the longitudinal axis 114 of the APU enclosure 100 is aligned with (e.g., coincident with) a longitudinal axis 218 of the airframe 202. In one or more examples, the longitudinal axis 114 of the APU enclosure 100 defines a longitudinal axis of the space frame 102 and the fairing 104. Throughout the present disclosure, the longitudinal axis 114 of the APU enclosure 100 may, but does not necessarily, refer to the longitudinal axis of the space frame 102 and/or the longitudinal axis of the fairing 104. The APU enclosure 100 is coupled to an adjacent section of the airframe 202 to form a portion of the fuselage 150.

As illustrated in FIG. 3, in an example, the space frame 102 includes, or takes the form of, a truss-like structure that has a closed cross-sectional shape, viewed along the longitudinal axis 114, and that forms an open interior region at least partially defining the APU compartment 130. Generally, the space frame 102 includes, or forms, a plurality of triangular units constructed with the plurality of frame elements 124 that are connected to each other at joints, referred to as the plurality of nodes 110. Thus, external forces and reactions to those forces are considered to act only at the plurality of nodes 110 and result in forces in the plurality of frame elements 124 that are either tensile or compressive. Accordingly, the space frame 102 is an internal structure that provides load-carrying capacity for an associated portion (e.g., the tail portion) of the fuselage 150.

FIG. 3 depicts a portion of the fairing 104 removed so that the space frame 102 is more clearly visible. In an example, the fairing 104 has a closed cross-sectional shape, viewed along the longitudinal axis 114, that at partially surrounds the space frame 102. Accordingly, the fairing 104 is an external structure that provides for a smooth outline for the associated portion of the fuselage 150 and reduces drag of the fuselage 150.

As illustrated in FIG. 3, in an example, the airframe 202 is a semi-monocoque structure that includes a plurality of frames 228 and an outer skin 224 with a plurality of stringers 226 coupled to the outer skin 224. The outer skin 224 and the plurality of stringers 226 are coupled to the plurality of frames 228. In the semi-monocoque type airframe assembly, the plurality of frames 228 (also referred to as formers) establishes the shape of the fuselage 150 and loads are supported, at least in part, by the plurality of stringers 226 of the airframe 202. In another example, the airframe 202 is a monocoque structure that includes the plurality of frames 228 and the outer skin 224, which is coupled to the plurality of frames 228. In the monocoque-type airframe assembly, the plurality of frames 228 establishes the shape of the fuselage 150 and loads are supported through the outer skin 224 of the airframe 202.

Referring still to FIG. 3, the APU enclosure 100 is coupled to or is otherwise structurally integrated with the airframe 202 to form the fuselage 150 (only a section of the airframe 202 and the APU enclosure 100 are depicted in FIG. 3 to illustrate a portion of the fuselage 150). In an example, one or more of the plurality of frame elements 124 of the space frame 102 of the APU enclosure 100 are coupled to or are otherwise structurally joined with one or more of the plurality of frames 228 and/or the plurality of stringers 226 of the airframe 202 to provide a load path between the APU enclosure 100 and the airframe 202. In an example, the fairing 104 of the APU enclosure 100 is integrated with or is otherwise joined to the outer skin 224 of the airframe 202 to provide a smooth outline of the fuselage 150 and reduce drag. In an example, a firewall 230 is located between the airframe 202 and the APU enclosure 100.

Referring to FIG. 1, in an example, the space frame 102 is formed of a first material 126 having a first critical temperature 132. The fairing 104 is formed of a second material 128 having a second critical temperature 134. The second critical temperature 134 is less than the first critical temperature 132. As used herein, critical temperature refers to a temperature at which a material (e.g., a metallic material or composite material) exceeds its ultimate strength and ceases to provide sufficient load carrying capacity. In an example, the first material 126 does not exceed its ultimate strength in response to temperatures approximating the first critical temperature 132. In an example, the second material 128 does not exceed its ultimate strength in response to temperatures approximating the second critical temperature 134, however, may exceed its ultimate strength in response to temperatures approximating the first critical temperature 132. This critical temperature and ultimate strength differential enables the space frame 102 to withstand a thermal event and maintain its load-carrying capacity in response to extreme temperatures within the APU compartment 130, while the fairing 104 is permitted to structurally degrade in response to such temperatures.

In an example, the first critical temperature 132 is at least 500° F. (260° C.) and the second critical temperature 134 is below 500° F. (260° C.). In another example, the first critical temperature 132 is at least 600° F. (315° C.) and the second critical temperature 134 is below 600° F. (315° C.). In another example, the first critical temperature 132 is at least 700° F. (350° C.) and the second critical temperature 134 is below 700° F. (350° C.). In another example, the first critical temperature 132 is at least 800° F. (425° C.) and the second critical temperature 134 is below 800° F. (425° C.). In other examples, the first critical temperature 132 may be below 500° F. (260° C.) or above 800° F. (425° C.), depending on the composition of the first material 126.

A typical thermal event located within the APU compartment 130 of the APU enclosure 100 may reach temperatures between approximately 500° F. (260° C.) and approximately 800° F. (425° C.) in regions proximate to the space frame 102 and the fairing 104. During a thermal event, the space frame 102 (e.g., the plurality of frame elements 124) does not exceed its ultimate strength when experiencing temperatures between approximately 500° F. (260° C.) and approximately 800° F. (425° C.). As such, the space frame 102 maintains its load-carrying capacity and structural integrity when exposed to such extreme temperatures. The fairing 104 may exceed its ultimate strength and begin to plastically deform when exposed to such temperatures. However, since the fairing 104 does not serve as a primary structural (e.g., load-bearing) component of the fuselage 150, plastic deformation, or even destruction, of the fairing 104 does not affect the structural integrity of the APU enclosure 100.

Referring still to FIG. 1, in an example, the first material 126 of the space frame 102 includes a metallic material 136. In an example, the metallic material 136 is titanium. Titanium provides a beneficial strength-to-weight ratio for aerospace applications. In another example, the metallic material 136 is carbon steel. In another example, the metallic material 136 is a corrosion resistant steel (CRES). In another example, the metallic material 136 is a metal matrix composite. In another example, the metallic material 136 is titanium silicon carbide ($Ti_3SiC_2$). Other metals, metal alloys, or metallic composites are also contemplated for use as the metallic material 136 of the space frame 102.

In an example, the second material 128 of the fairing 104 includes a composite material 138. In an example, the composite material 138 is a fiber-reinforced polymer, such as a carbon fiber-reinforced polymer or a glass fiber-reinforced polymer (e.g., fiberglass). In another example, the second material 128 of the fairing 104 includes a metallic material, such as aluminum.

Referring to FIGS. 4-10, in an example, the plurality of frame elements 124 of the space frame 102 includes a plurality of annular frame elements 106 (also referred to individually as annular frame element 106). The plurality of annular frame elements 106 is spaced apart from each other along the longitudinal axis 114 (FIG. 3) of the space frame 102. Each one of the plurality of annular frame elements 106 circumscribes and is oriented approximately perpendicular to the longitudinal axis 114. The plurality of annular frame elements 106 establishes the shape of at least a portion of the APU enclosure 100. The plurality of frame elements 124 also includes a plurality of longitudinal frame elements 108 (also referred to individually as longitudinal frame element 108). The plurality of longitudinal frame elements 108 is coupled to the plurality of annular frame elements 106 at the plurality of nodes 110. Each one of the plurality of longitudinal frame elements 108 extends along the longitudinal axis 114 and approximately perpendicularly intersects one or more of the plurality of annular frame elements 106. The plurality of frame elements 124 also includes a plurality of diagonal frame elements 112 (also referred to individually as diagonal frame element 112). At least a portion of the plurality of diagonal frame elements 112 is coupled to at least one of the plurality of annular frame elements 106 and the plurality of longitudinal frame elements 108 proximate to the plurality of nodes 110. For the purpose of the present disclosure, the term "node" refers to a central or connecting point or region at which at least two of the annular frame element 106, the longitudinal frame element 108, and/or the diagonal frame element 112 intersect or branch. Thus, external forces and reactions to those forces are considered to act only at the plurality of nodes 110 and result in forces in one or more of the plurality of annular frame elements 106, the plurality of longitudinal frame elements 108, and the plurality of diagonal frame elements 112 that are either tensile or compressive. The plurality of diagonal frame elements 112 provide for redundant load paths through the space frame 102.

In an example, the plurality of annular frame elements 106 is formed of the first material 126 having the first critical temperature 132. In an example, the plurality of longitudinal frame elements 108 is formed of the first material 126 having the first critical temperature 132. In an example, the plurality of diagonal frame elements 112 is formed of the first material 126 having the first critical temperature 132. In an example, at least one of the plurality of annular frame elements 106, the plurality of longitudinal frame elements 108, and the plurality of diagonal frame elements 112 are formed of the metallic material 136, such as titanium.

Referring generally to FIG. 3 and particularly to FIGS. 4-7, in an example, ends of one or more of the plurality of longitudinal frame elements 108 of the space frame 102 are coupled to one or more of the plurality of frames 228 and/or one or more of the plurality of stringers 226 of the airframe 202 (FIG. 3) adjacent to the APU enclosure 100, depending on the type of airframe assembly. This arrangement enables the APU enclosure 100 to be structurally integrated into the remaining portions of the fuselage 150 and enables loads to be distributed between the space frame 102 and the airframe 202 adjacent to the APU enclosure 100.

Figure 8:
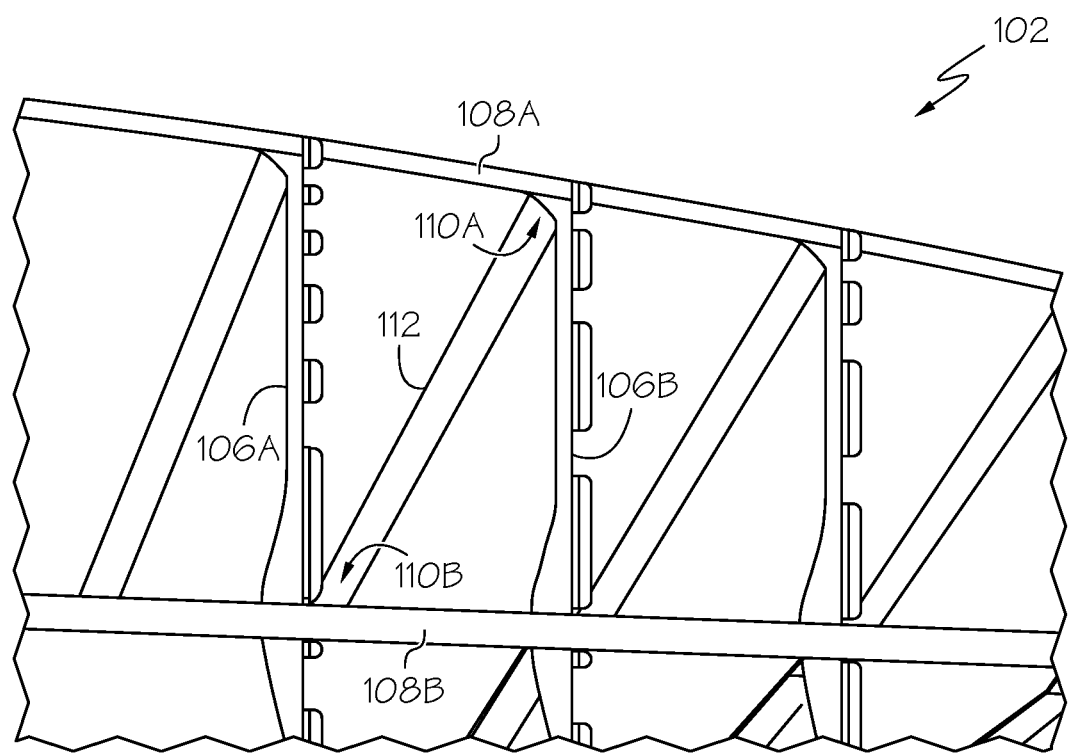
FIG. 8 is a schematic, elevation view of an example of a portion of the space frame.

Referring generally to FIGS. 4-7 and particularly to FIG. 8, in an example, each one of the plurality of diagonal frame elements 112 extends between a diagonally opposed pair of the plurality of nodes 110 (depicted individually in FIG. 8 as first node 110A and second node 110B and identified collectively as diagonally opposed pair of nodes 110A, 110B). The diagonally opposed pair of nodes 110A, 110B is formed at intersections of a longitudinally adjacent pair of the plurality of annular frame elements 106 (depicted individually in FIG. 8 as first annular frame element 106A and second annular frame element 106B and identified collectively as longitudinally adjacent pair of annular frame elements 106A, 106B) and a radially adjacent pair of the plurality of longitudinal frame elements 108 (depicted individually in FIG. 8 as first longitudinal frame element 108A and second longitudinal frame element 108B and identified collectively as radially adjacent pair of longitudinal frame elements 108A, 108B). As illustrated in FIG. 8, in an example, one end of the diagonal frame element 112 is coupled to at least one of the first annular frame element 106A and the second longitudinal frame element 108B proximate to the first node 110A. An opposing end of the diagonal frame element 112 is coupled to at least one of the second annular frame element 106B and the first longitudinal frame element 108A proximate to the second node 110B. This arrangement is repeated along the longitudinal axis 114 (FIG. 3) of the space frame 102 to provide redundant load paths between each diagonally opposed pair of nodes 110A, 110B.

Figure 9:
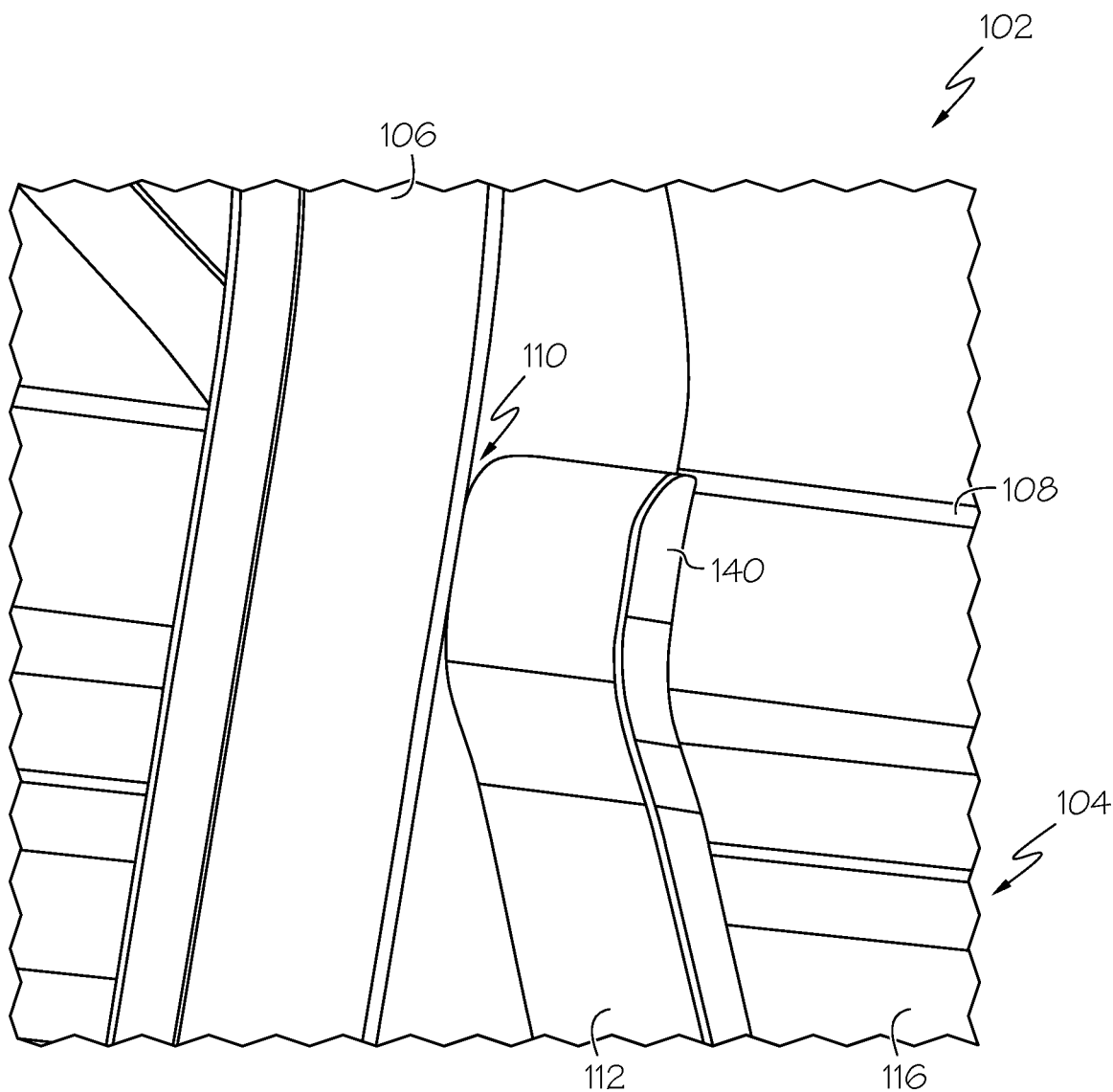
FIG. 9 is a schematic, perspective view of an example of a portion of the auxiliary power unit enclosure.

Referring generally to FIGS. 4-8 and particularly to FIG. 9, in an example, an end 140 of the diagonal frame element 112 is coupled to the annular frame element 106 proximate to the node 110. In another example, the end 140 of the diagonal frame element 112 is coupled to the longitudinal frame element 108 proximate to the node 110. In another example, the end 140 of the diagonal frame element 112 is coupled to the annular frame element 106 and the longitudinal frame element 108 proximate to the node 110.

The particular shape, dimensions, and angular orientation of each one of the diagonal frame elements 112 depends on various factors, such as the number of annular frame elements 106, the number of longitudinal frame element 108, the shape and dimensions of the space frame 102, and other factors. In an example, one or more of the diagonal frame elements 112 includes one or more twists about its length. In an example, one or more of the diagonal frame elements 112 includes one or more bends along its length.

Figure 4:
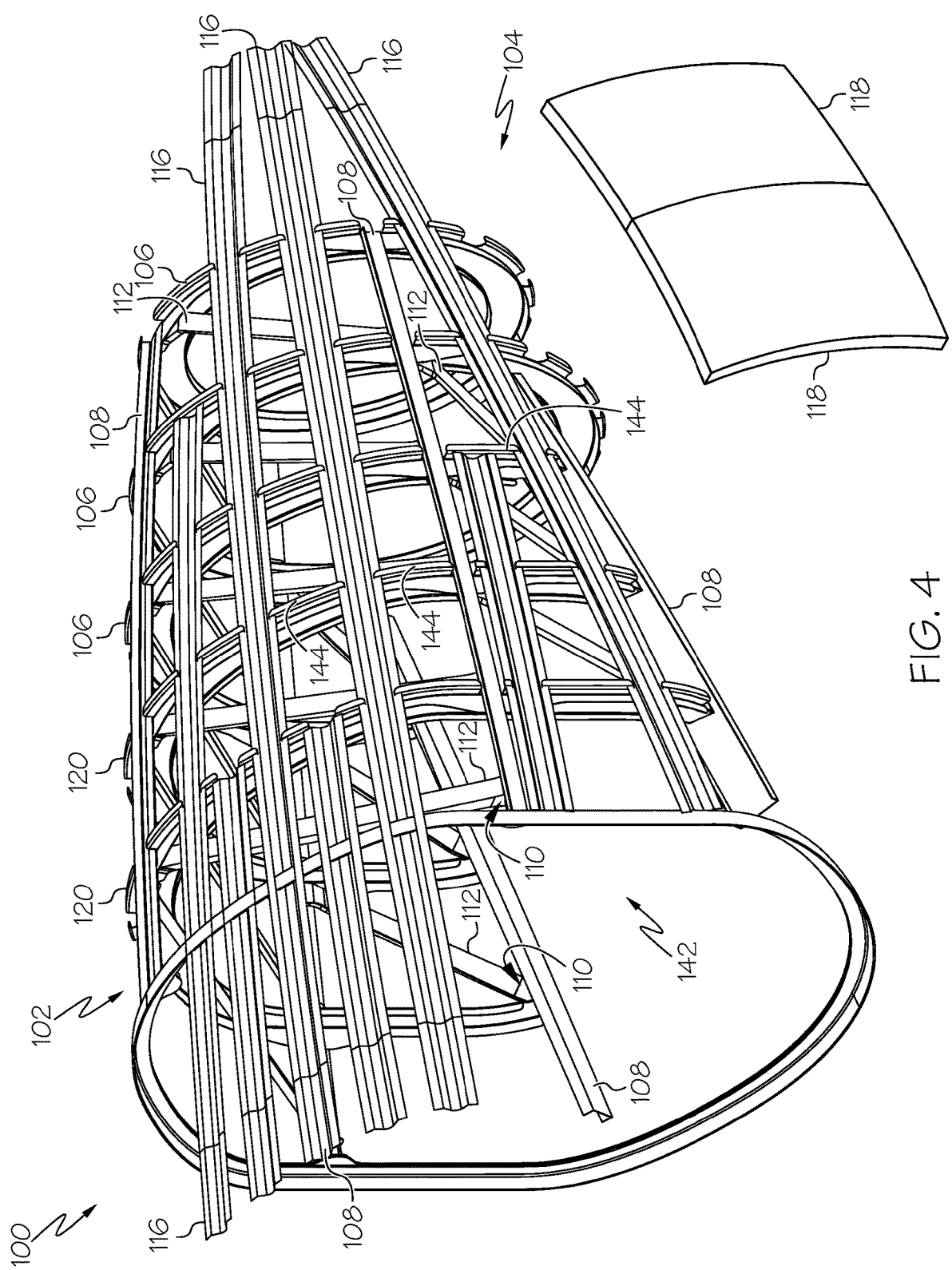
FIG. 4 is a schematic, perspective view of an example of an auxiliary power unit enclosure of the fuselage of FIG. 1.
Figure 5:
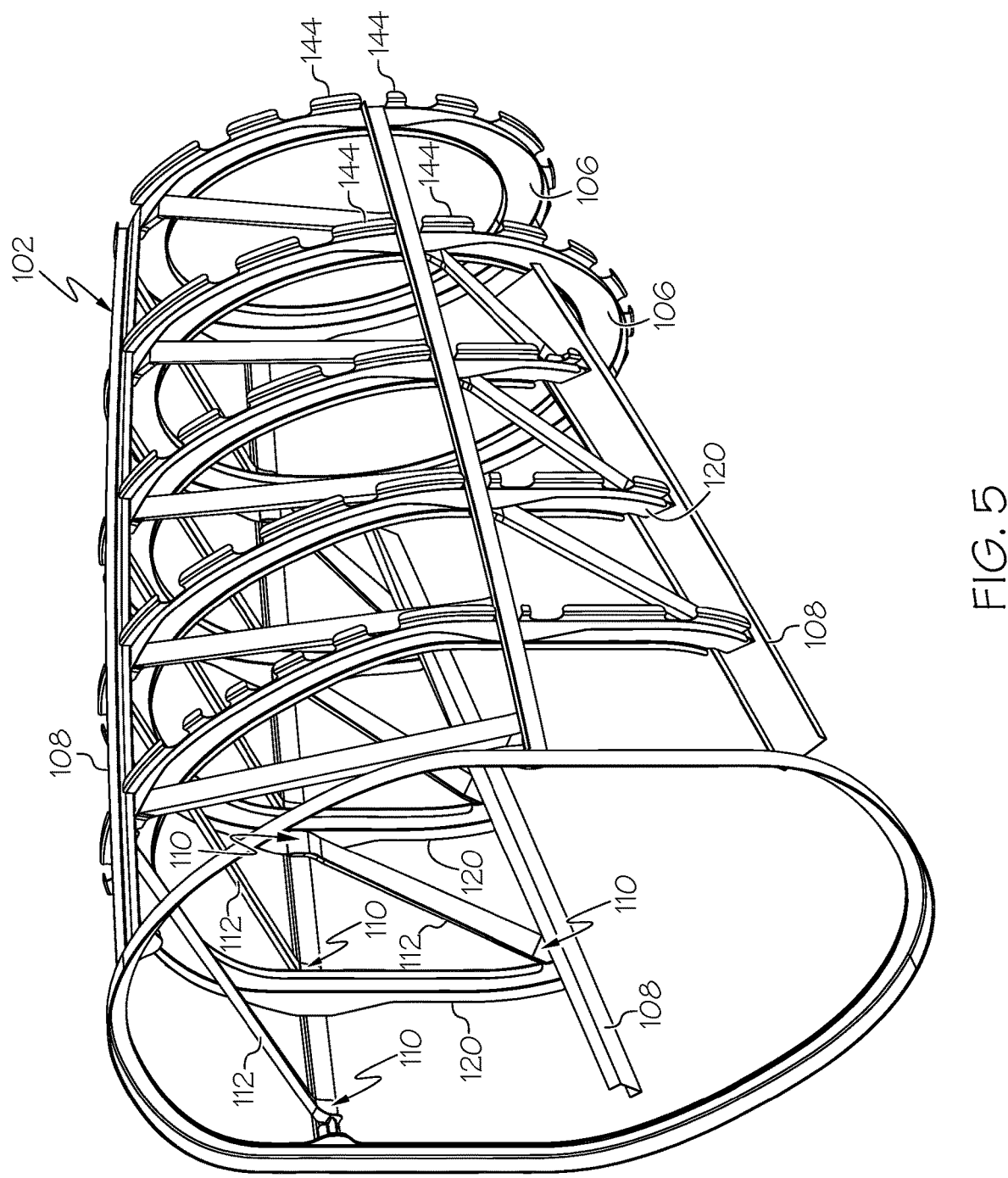
FIG. 5 is a schematic, perspective view of an example of a space frame of the auxiliary power unit enclosure of FIG. 4.
Figure 6:
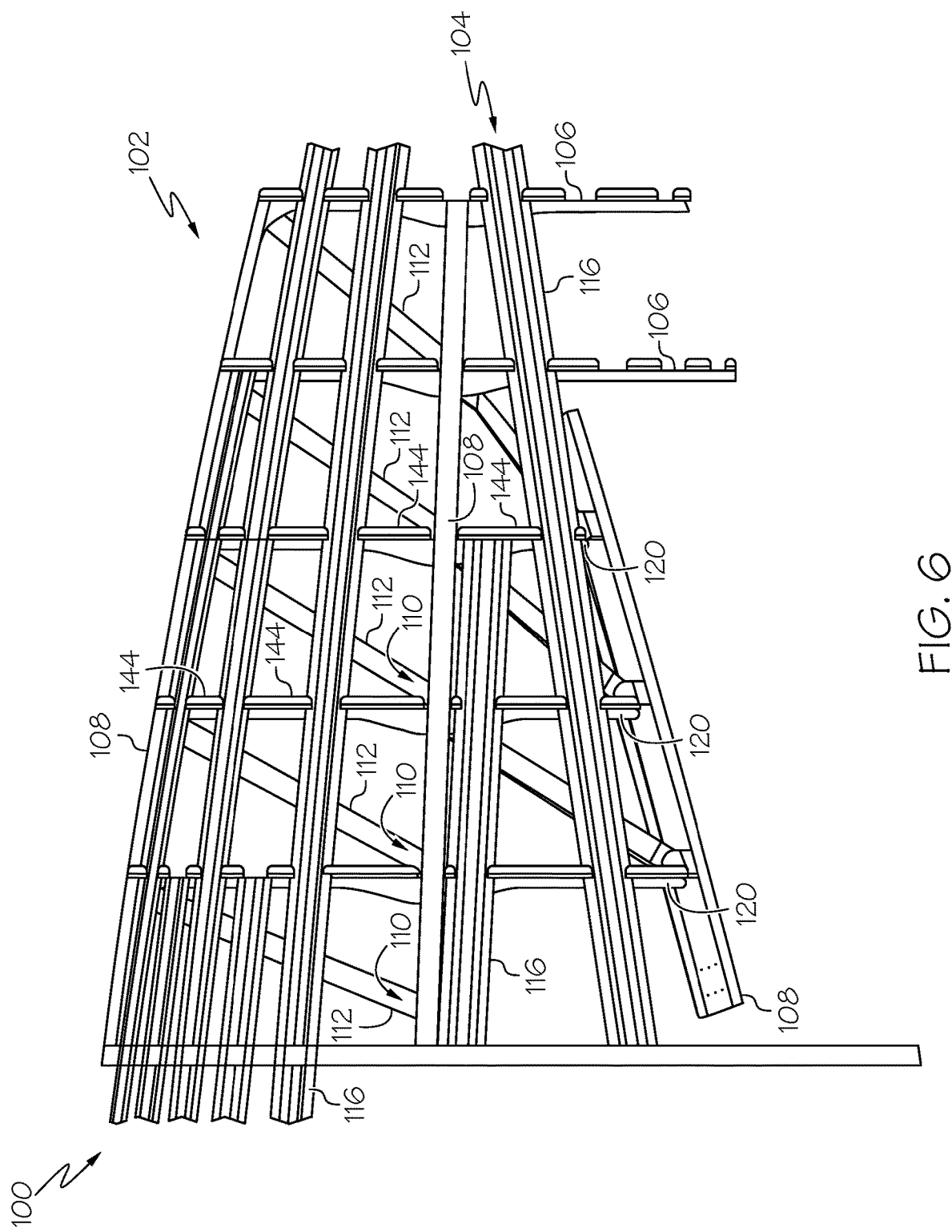
FIG. 6 is a schematic, elevation view of an example of the auxiliary power unit enclosure.
Figure 7:
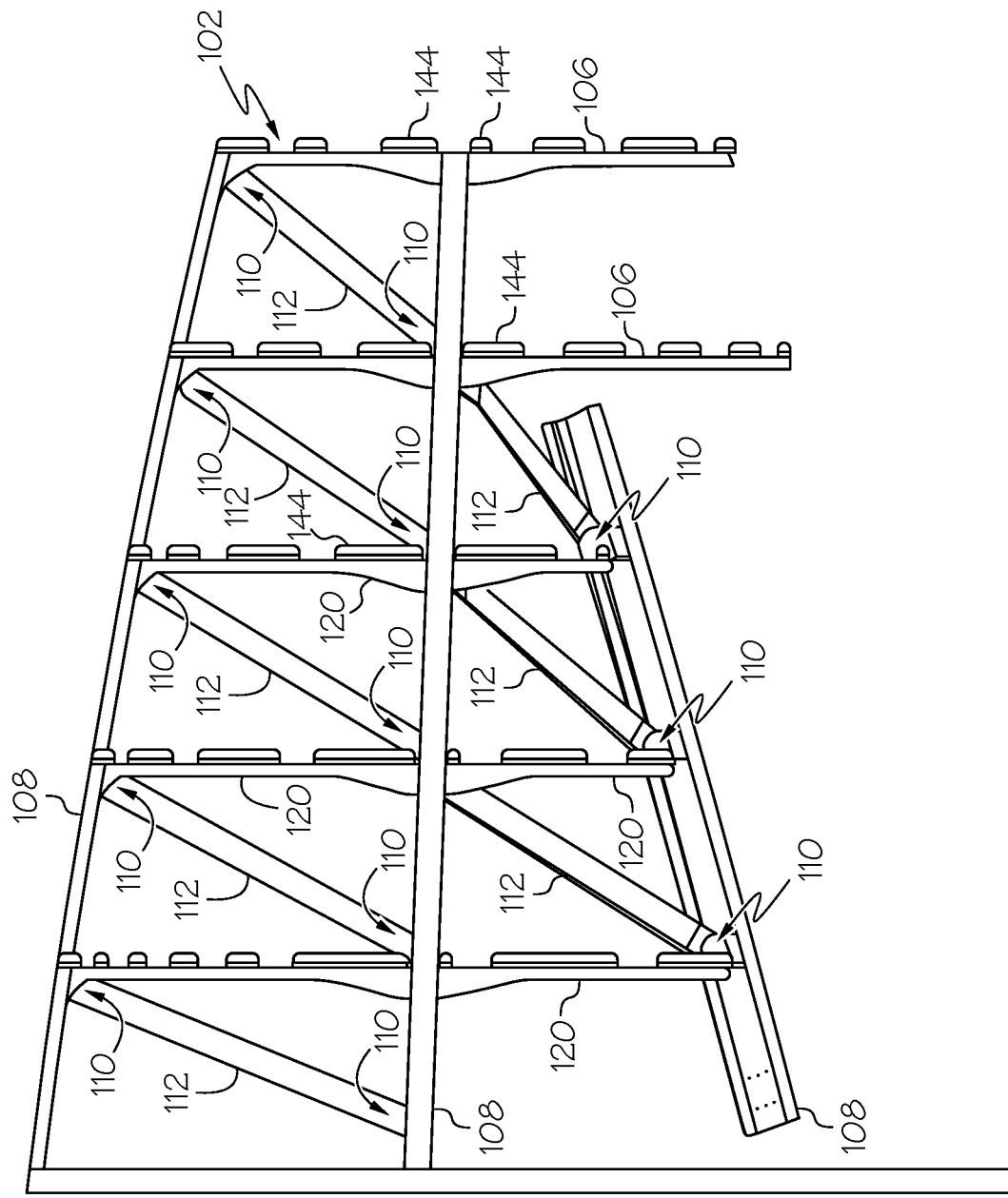
FIG. 7 is a schematic, elevation view of an example of the space frame of the auxiliary power unit enclosure of FIG. 6.

Referring to generally to FIGS. 2 and 3 and particularly to FIGS. 4 and 6, in an example, the fairing 104 may include a plurality of stiffeners 116 and a plurality of skins 118 (FIG. 4). The plurality of skins 118 is coupled to the plurality of stiffeners 116. In an example, the plurality of stiffeners 116 is coupled to at least one of the plurality of annular frame elements 106. In an example, the plurality of skins 118 is coupled to at least one of the plurality of annular frame elements 106. FIG. 4 depicts a portion of the plurality of stiffeners 116 coupled to a portion of the plurality of annular frame elements 106 and a portion of the plurality of skins 118 exploded from the plurality of stiffeners 116 and the plurality of annular frame elements 106. FIG. 6 depicts a portion of the plurality of stiffeners 116 coupled to a portion of the plurality of annular frame elements 106 and the plurality of skins 118 removed for clarity. In another example, the fairing 104 may include the plurality of skins 118 that are coupled to at least one of the annular frame elements 106 and/or at least one of the longitudinal frame elements 108, such as illustrated in FIG. 3.

Referring generally to FIG. 3 and particularly to FIGS. 4 and 6, in an example, ends of one or more of the plurality of stiffeners 116 of the fairing are coupled to one or more of the plurality of frames 228 and/or one or more of the plurality of stringers 226 of the airframe 202 (FIG. 3) adjacent to the APU enclosure 100, depending on the type of airframe assembly. Edges of one or more of the plurality of skins 118 are abutted with and joined to adjacent edges of the outer skin 224 of the airframe 202. This arrangement enables the APU enclosure 100 to aerodynamically integrated into the remaining portions of the fuselage 150.

In an example, the plurality of stiffeners 116 is formed of the second material 128 having the second critical temperature 134. In an example, the plurality of skins 118 is formed of the second material 128 having the second critical temperature 134. In example, at least one of the plurality of stiffeners 116 and the plurality of skins 118 is formed of the composite material 138, such as the fiber-reinforced polymer, such as the carbon fiber-reinforced polymer or fiberglass. In an example, the skins 118 are formed of at least one sandwich panel, such as a honeycomb panel or foam core sandwich panel.

Figure 10:
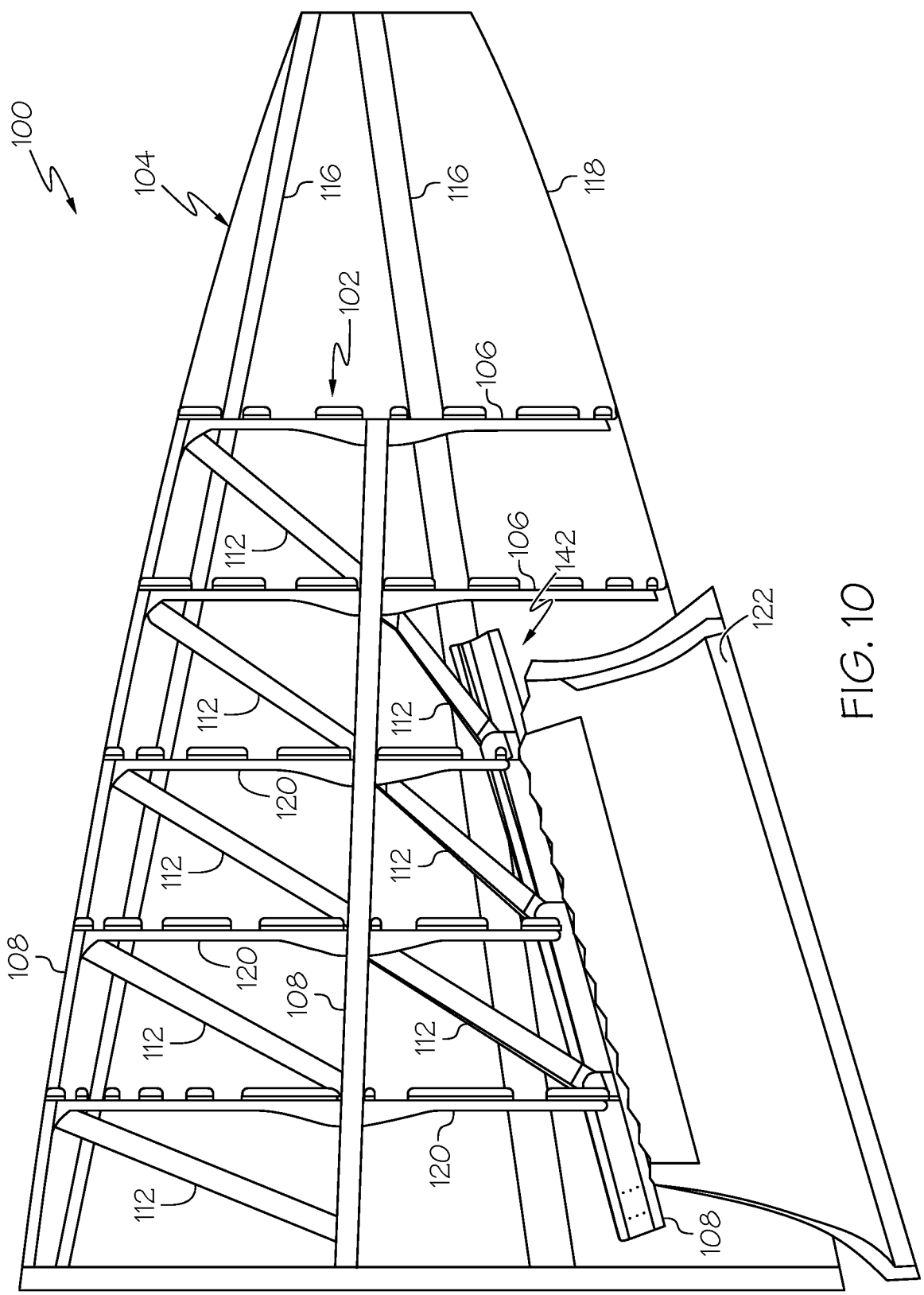
FIG. 10 is a schematic, elevation view of an example of the auxiliary power unit enclosure of FIG. 1.

Referring to generally to FIGS. 3-7 and particularly to FIG. 10, in an example, the APU enclosure 100 includes a door 122 (FIG. 10). In an example, the space frame 102 includes a plurality of semi-annular frame elements 120 (also referred to individually as semi-annular frame element 120). The plurality of semi-annular frame elements 120 is spaced apart from each other and the plurality of annular frame elements 106 along the longitudinal axis 114 (FIG. 3) of the space frame 102. Each one of the plurality of semi-annular frame elements 120 circumscribes and is oriented approximately perpendicular to the longitudinal axis 114. The plurality of semi-annular frame elements 120 establishes the shape of a portion of the APU enclosure 100. An open region 142 (FIGS. 4 and 10) formed by the semi-annular frame elements 120 is configured to accommodate the door 122. The plurality of longitudinal frame elements 108 is coupled to the plurality of semi-annular frame elements 120 at the plurality of nodes 110. Each one of the plurality of longitudinal frame elements 108 approximately perpendicularly intersects one or more of the plurality of semi-annular frame elements 120. A portion of the plurality of diagonal frame elements 112 is coupled to at least one of the plurality of semi-annular frame elements 120 and the plurality of longitudinal frame elements 108 proximate to the plurality of nodes 110.

As illustrated in FIG. 10, in an example, the door 122 is coupled to at least one of the plurality of semi-annular frame elements 120 and/or at least one of the plurality of longitudinal frame elements 108 that intersects the plurality of semi-annular frame elements 120 and that at least partially defines the open region 142 (FIG. 4). The door 122 is moveable relative to the plurality of semi-annular frame elements 120 and/or the plurality of longitudinal frame elements 108 to which it is coupled. The door 122 provides access to the APU compartment 130 (FIG. 3) and, thus, the APU 222 (FIG. 2).

Referring to FIGS. 4-7, in an example, one or more of the plurality of annular frame elements 106 include a plurality of shear ties 144 (also referred to as individually as shear tie 144). The plurality of shear ties 144 is spaced apart from each other and extends about at least a portion of a perimeter of the annular frame element 106. As best illustrated in FIGS. 4 and 6, an open region (commonly referred to as a mouse hole) formed between adjacent ones of the shear ties 144 accommodates one of the plurality of longitudinal frame elements 108 of the space frame 102 or one of the plurality of stiffeners 116 of the fairing 104. Similarly, in an example, one or more of the plurality of semi-annular frame elements 120 include the plurality of shear ties 144 to accommodate ones of the plurality of longitudinal frame elements 108 of the space frame 102 and ones of the plurality of stiffeners 116 of the fairing 104.

In an example, at least a portion of the plurality of shear ties 144 is formed of the first material 126 having the first critical temperature 132. As an example, at least a portion of the plurality of shear ties 144 is formed of the metallic material 136, such as titanium. In another example, at least a portion of the plurality of shear ties 144 is formed of the second material 128 having the second critical temperature 134. As an example, at least a portion of the plurality of shear ties 144 is formed of the composite material 138, such as the fiber-reinforced polymer, such as the carbon fiber-reinforced polymer.

Figure 11:
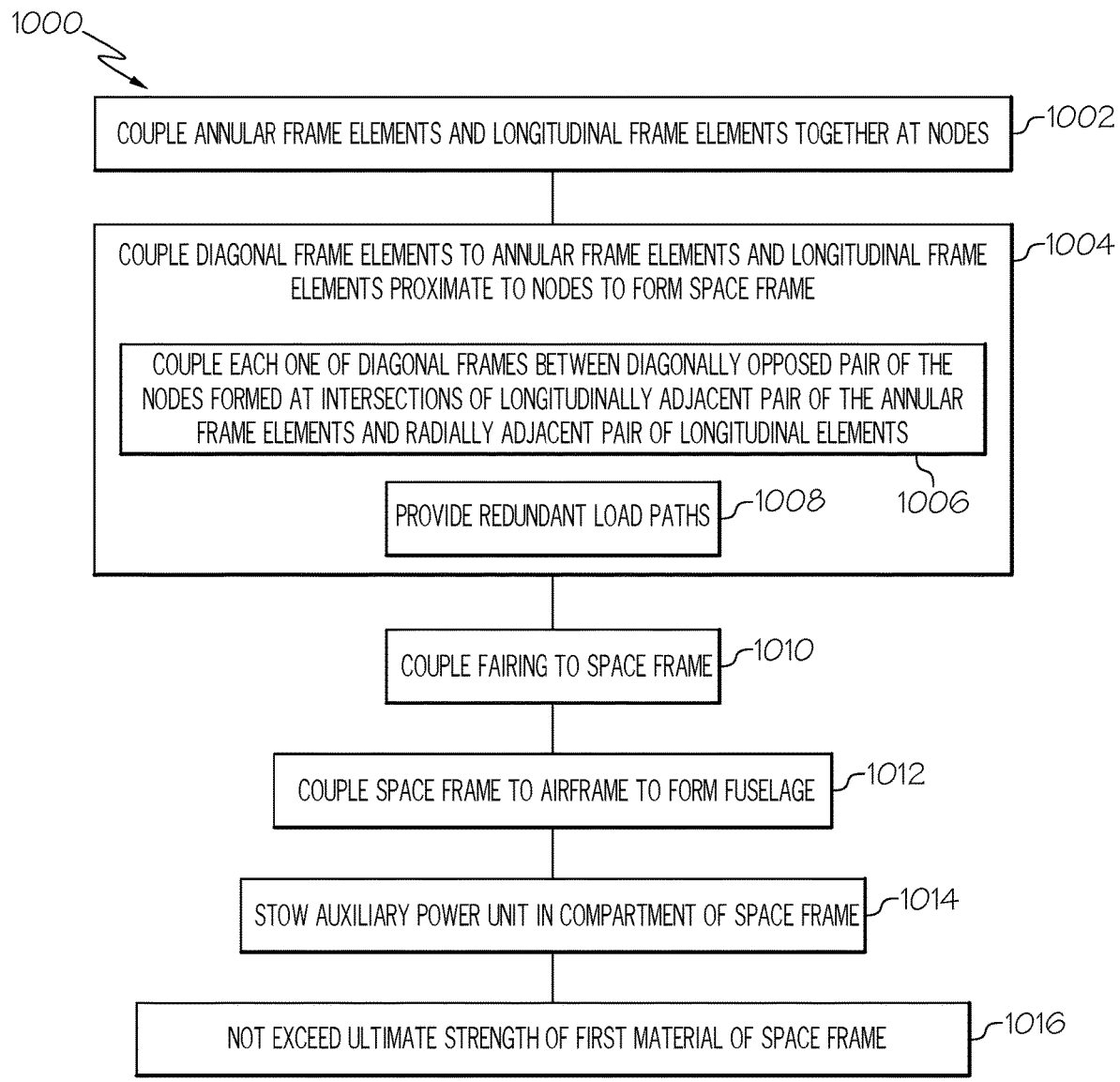
FIG. 11 is a flow diagram of an example of a method of making an aircraft.

Referring generally to FIGS. 1-10 and particularly to FIG. 11, examples of a method 1000 of making the aircraft 200 are disclosed. The aircraft 200 (FIGS. 1 and 2) manufactured according to the method 1000 includes the airframe 202 and the APU enclosure 100 that form at least a portion of the fuselage 150.

In an example, the method 1000 includes a step of (block 1002) coupling the plurality of annular frame elements 106 and the plurality of longitudinal frame elements 108 together at the plurality of nodes 110. The method 1000 includes a step of (block 1004) coupling the plurality of diagonal frame elements 112 to at least one of the plurality of annular frame elements 106 and the plurality of longitudinal frame elements 108 proximate to the plurality of nodes 110 to form the space frame 102.

In an example, according to the method 1000, the step of coupling the plurality of diagonal frame elements 112 to at least one of the plurality of annular frame elements 106 and the plurality of longitudinal frame elements 108 includes a step of (block 1006) coupling each one of the plurality of diagonal frame elements 112 between a diagonally opposed pair of the plurality of nodes 110 formed at intersections of a longitudinally adjacent pair of the plurality of annular frame elements 106 and a radially adjacent pair of the plurality of longitudinal frame elements 108. According to the method 1000, the step of coupling the plurality of diagonal frame elements 112 to at least one of the plurality of annular frame elements 106 and the plurality of longitudinal frame elements 108 includes a step of (block 1008) providing a plurality of redundant load paths.

In an example, the method 1000 includes a step of (block 1010) coupling the fairing 104 to the space frame 102. The method 1000 includes a step of (block 1012) coupling the space frame 102 to the airframe 202 to form the fuselage 150 of the aircraft 200.

In an example, the method 1000 includes a step of (block 1014) stowing the APU 222 of the aircraft 200 in the APU compartment 130 defined by the space frame 102. According to the method 1000, the space frame 102 is formed of the first material 126 having the first critical temperature 132, the fairing 104 is formed of the second material 128 having the second critical temperature 134, and the second critical temperature 134 is less than the first critical temperature 132.

In an example, the method 1000 includes a step of (block 1016) not exceeding the ultimate strength of the first material 126 of the space frame 102 in response to a temperature up to the first critical temperature 132.

Figure 12:
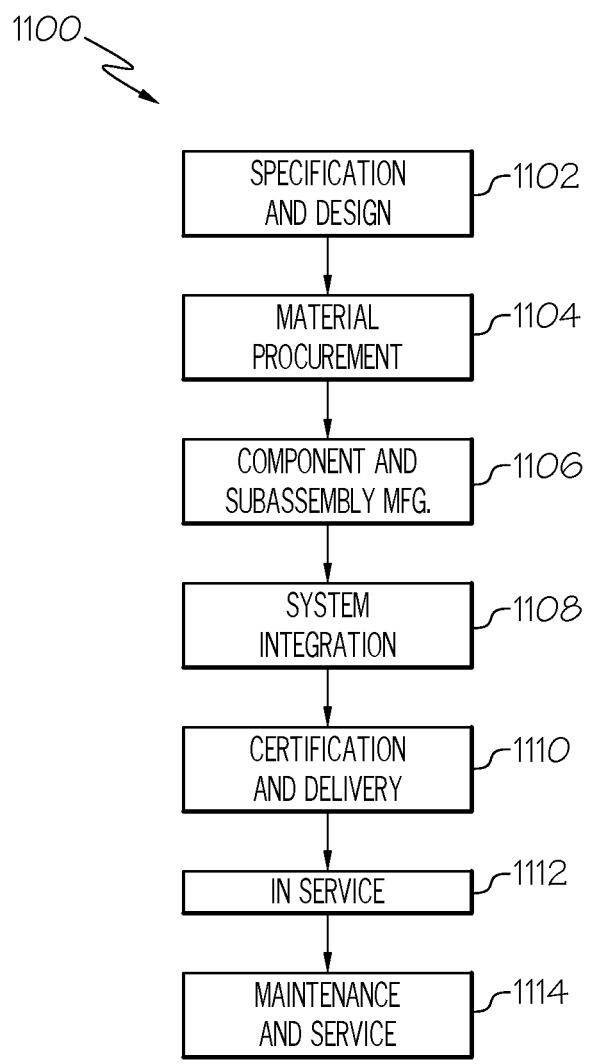
FIG. 12 is a flow diagram of an example aircraft production and service methodology.

Examples of the APU enclosure 100, the fuselage 150, the aircraft 200, and the method 1000 may be used in the context of an aircraft manufacturing and service method 1100, as shown in the flow diagram of FIG. 12. Aircraft applications of the disclosed examples may include manufacture, operation, and service of an aircraft that includes a fuselage compartment configured to stow an auxiliary power unit. While the examples of APU enclosure 100 and the method 1000 are described in connection with aerospace applications, the APU enclosure 100 and the method 1000 may find use in a variety of potential applications, particularly in the transportation industry for use with any type of vehicle that utilizes an auxiliary power unit.

As illustrated in FIG. 12, during pre-production, the method 1100 may include specification and design of the aircraft 200 (block 1102) and material procurement (block 1104). During production of the aircraft 200, component and subassembly manufacturing (block 1106) and system integration (block 1108) of the aircraft 200 may take place. Thereafter, the aircraft 200 may go through certification and delivery (block 1110) to be placed in service (block 1112). The disclosed APU enclosure 100 and method 1000 may form a portion of component and subassembly manufacturing (block 1106) and/or system integration (block 1108). Routine maintenance and service (block 1114) may include modification, reconfiguration, refurbishment, etc. of one or more systems of the aircraft 200.

Each of the processes of the method 1100 illustrated in FIG. 12 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the APU enclosure 100 and the method 1000 shown or described herein may be employed during any one or more of the stages of the manufacturing and service method 1100 shown in the flow diagram illustrated by FIG. 12. For example, components or subassemblies, such as the space frame 102 and the fairing 104 of the APU enclosure 100, corresponding to component and subassembly manufacturing (block 1106) may be fabricated or manufactured in a manner similar to components or subassemblies produced while the aircraft 200 is in service (block 1112). Also, one or more examples of the APU enclosure 100 and the method 1000 disclosed herein may be utilized during production stages (block 1108 and block 1110). Similarly, one or more examples of the APU enclosure 100 and the method 1000 disclosed herein may be utilized, for example and without limitation, while the aircraft 200 is in service (block 1112) and during maintenance and service (block 1114).

Although an aerospace example is shown, the principles disclosed herein may be applied to other industries, such as the automotive industry, the space industry, the construction industry, and other design and manufacturing industries. Accordingly, in addition to aircraft, the principles disclosed herein may apply to other vehicle structures (e.g., land vehicles, marine vehicles, space vehicles, etc.) and stand-alone structures.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless otherwise indicated, the terms "first", "second", etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

For the purpose of this disclosure, the terms "coupled," "coupling," and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

As used herein, the term "approximately" refers to or represents a condition that is close to, but not exactly, the stated condition that still performs the desired function or achieves the desired result. In an example, the term "approximately" refers to a condition that is within an acceptable predetermined tolerance or accuracy. In an example, the term "approximately" refers to a condition that is within 10% of the stated condition. However, the term "approximately" does not exclude a condition that is exactly the stated condition. Accordingly, the term "approximately" may be interpreted to mean exactly to or within a desired degree of accuracy.

In FIG. 1, referred to above, the blocks may represent elements, components, and/or portions thereof and lines, if any, connecting various elements and/or components may represent mechanical, electrical, fluid, optical, electromagnetic and other couplings and/or combinations thereof. Couplings other than those depicted in the block diagrams may also exist. One or more elements shown may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1, may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 11 and 12, referred to above, the blocks may represent operations and/or portions thereof and lines connecting the various blocks do not imply any particular order or dependency of the operations or portions thereof. It will be understood that not all dependencies among the various disclosed operations are necessarily represented. FIGS. 11 and 12 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various examples of the disclosed APU enclosure 100, the fuselage 150, the aircraft 200, and the method 1000 have been shown and described, modifications may occur to those skilled in the art upon reading the specification. The present application includes such modifications and is limited only by the scope of the claims.

What is claimed is:

1. An auxiliary power unit enclosure of an aircraft comprising:
    a space frame configured to be coupled to an airframe of a fuselage of the aircraft and to carry a load, the space frame having a cross-sectional shape that establishes a cross-sectional shape of a portion of the fuselage, extending from the airframe along a longitudinal axis, and that defines an auxiliary power unit compartment of the aircraft, wherein:
        the space frame comprises a plurality of frame elements coupled together at a plurality of nodes, wherein the plurality of frame elements comprises:
            a plurality of annular frame elements spaced apart from each other along the longitudinal axis;
            a plurality of longitudinal frame elements coupled to the plurality of annular frame elements at the plurality of nodes; and
            a plurality of diagonal frame elements coupled to at least one of the plurality of annular frame elements and the plurality of longitudinal frame elements proximate to the plurality of nodes; and
        the plurality of frame elements is formed of a first material having a first critical temperature; and
    a fairing coupled to at least a portion of the plurality of annular frame elements and surrounding the space frame to establish an exterior surface of the portion of the fuselage, wherein the fairing is formed of a second material having a second critical temperature that is less than the first critical temperature.

2. The auxiliary power unit enclosure of claim 1, wherein:
    the first material of the space frame comprises a metallic material; and
    the second material of the fairing comprises a composite material.

3. The auxiliary power unit enclosure of claim 2, wherein:
the metallic material comprises at least one of titanium, corrosion resistant steel, and a metal matrix composite; and
the composite material is a fiber-reinforced polymer.

4. The auxiliary power unit enclosure of claim 1, wherein each one of the plurality of diagonal frame elements extends between a diagonally opposed pair of the plurality of nodes formed at intersections of a longitudinally adjacent pair of the plurality of annular frame elements and a radially adjacent pair of the plurality of longitudinal frame elements.

5. The auxiliary power unit enclosure of claim 1, wherein the fairing comprises:
a plurality of stiffeners coupled to at least one of the plurality of annular frame elements; and
a plurality of skins coupled to the plurality of stiffeners.

6. The auxiliary power unit enclosure of claim 1, further comprising a door, and wherein:
the space frame further comprises a plurality of semi-annular frame elements spaced apart from each other and the plurality of annular frame elements along the longitudinal axis of the space frame;
the plurality of longitudinal frame elements is coupled to the plurality of semi-annular frame elements at the plurality of nodes;
the plurality of diagonal frame elements is coupled to at least one of the plurality of semi-annular frame elements and the plurality of longitudinal frame elements proximate to the plurality of nodes; and
the door is coupled to and is moveable relative to the plurality of semi-annular frame elements.

7. A fuselage of an aircraft comprising:
an airframe having a cross-sectional shape that establishes a cross-sectional shape of a first portion of the fuselage;
a space frame coupled to the airframe and configured to carry a load, the space frame having a cross-sectional shape that establishes a cross-sectional shape of a second portion of the fuselage, extending from the first portion of the fuselage along a longitudinal axis, and that defines an auxiliary power unit compartment for stowing an auxiliary power unit of the aircraft; and
a fairing coupled to and surrounding the space frame to establish an exterior surface of the second portion of the fuselage,
wherein:
the space frame comprises a plurality of frame elements coupled together at a plurality of nodes,
the plurality of frame elements comprises:
a plurality of annular frame elements longitudinally spaced apart from each other along the longitudinal axis;
a plurality of longitudinal frame elements radially spaced apart from each other about the longitudinal axis of the space frame and coupled to the plurality of annular frame elements at the plurality of nodes; and
a plurality of diagonal frame elements, each one of the plurality of diagonal frame elements coupled to one of the plurality of annular frame elements at one of the plurality of nodes and to one of the plurality of longitudinal frame elements at another one of the plurality of nodes;
the plurality of frame elements is formed of a first material having a first critical temperature; and
the fairing comprises:
a plurality of stiffeners coupled to at least some of the plurality of annular frame elements and extending along the longitudinal axis; and
a plurality of skins coupled to the plurality of stiffeners; and
the plurality of stiffeners and the plurality of skins are formed of a second material having a second critical temperature that is less than the first critical temperature.

8. The fuselage of claim 7, wherein the airframe is a semi-monocoque structure comprising:
an outer skin;
a plurality of stringers coupled to the outer skin; and
a plurality of frames coupled to the outer skin.

9. The fuselage of claim 7, wherein:
the first material of the space frame comprises at least one of titanium, corrosion resistant steel, and a metal matrix composite; and
the second material of the fairing is a fiber-reinforced polymer.

10. The fuselage of claim 7, wherein each one of the plurality of diagonal frame elements extends between a diagonally opposed pair of the plurality of nodes formed at intersections of a longitudinally adjacent pair of the plurality of annular frame elements and a radially adjacent pair of the plurality of longitudinal frame elements.

11. The fuselage of claim 7, further comprising a door for accessing the auxiliary power unit compartment; and wherein:
the space frame further comprises a plurality of semi-annular frame elements spaced apart from each other and the plurality of annular frame elements along the longitudinal axis of the space frame;
the plurality of longitudinal frame elements is coupled to the plurality of semi-annular frame elements at the plurality of nodes;
the plurality of diagonal frame elements is coupled to at least one of the plurality of semi-annular frame elements and the plurality of longitudinal frame elements proximate to the plurality of nodes; and
the door is coupled to and is moveable relative to the plurality of semi-annular frame elements.

12. A method of making an aircraft, the method comprising:
coupling a plurality of annular frame elements and a plurality of longitudinal frame elements together at a plurality of nodes and coupling a plurality of diagonal frame elements to at least one of the plurality of annular frame elements and the plurality of longitudinal frame elements proximate to the plurality of nodes to form a space frame, wherein:
the space frame is configured to carry a load;
the space frame has a cross-sectional shape that establishes a cross-sectional shape of a portion of a fuselage of the aircraft and that defines an auxiliary power unit compartment of the aircraft; and
the plurality of frame elements is formed of a first material having a first critical temperature;
coupling a fairing to at least a portion of the plurality of annular frame elements of the space frame to establish an exterior surface of the portion of the fuselage, wherein the fairing is formed of a second material having a second critical temperature that is less than the first critical temperature; and
coupling the space frame to an airframe that forms another portion of the fuselage of the aircraft.

13. The method of claim 12, wherein:
the step of coupling the plurality of diagonal frame elements to the at least one of the plurality of annular frame elements and the plurality of longitudinal frame elements proximate to the plurality of nodes comprises coupling each one of the plurality of diagonal frame elements between a diagonally opposed pair of the plurality of nodes formed at intersections of a longitudinally adjacent pair of the plurality of annular frame elements and a radially adjacent pair of the plurality of longitudinal frame elements.

14. The method of claim 12, further comprising stowing an auxiliary power unit of the aircraft in the auxiliary power unit compartment defined by the space frame.

15. The method of claim 14, further comprising not exceeding an ultimate strength of the first material of the space frame in response to a temperature within the auxiliary power unit compartment up to the first critical temperature.

16. The auxiliary power unit enclosure of claim 1, wherein the first critical temperature is above approximately 500 degrees Fahrenheit.

17. The fuselage of claim 1, wherein the first critical temperature is between approximately 500 degrees Fahrenheit and approximately 800 degrees Fahrenheit.

18. The auxiliary power unit enclosure of claim 1, wherein the space frame is configured to extend between the airframe of the fuselage and a tail section of the aircraft along the longitudinal axis.

19. The fuselage of claim 7, further comprising a tail section coupled to the space frame opposite the airframe.

20. The fuselage of claim 7, wherein:
the first material of the space frame comprises a metallic material; and
the second material of the fairing comprises a composite material.

* * * * *